March 28, 1939.  A. N. PORTER  2,152,387
OILLESS BEARING
Filed May 1, 1937   3 Sheets-Sheet 1
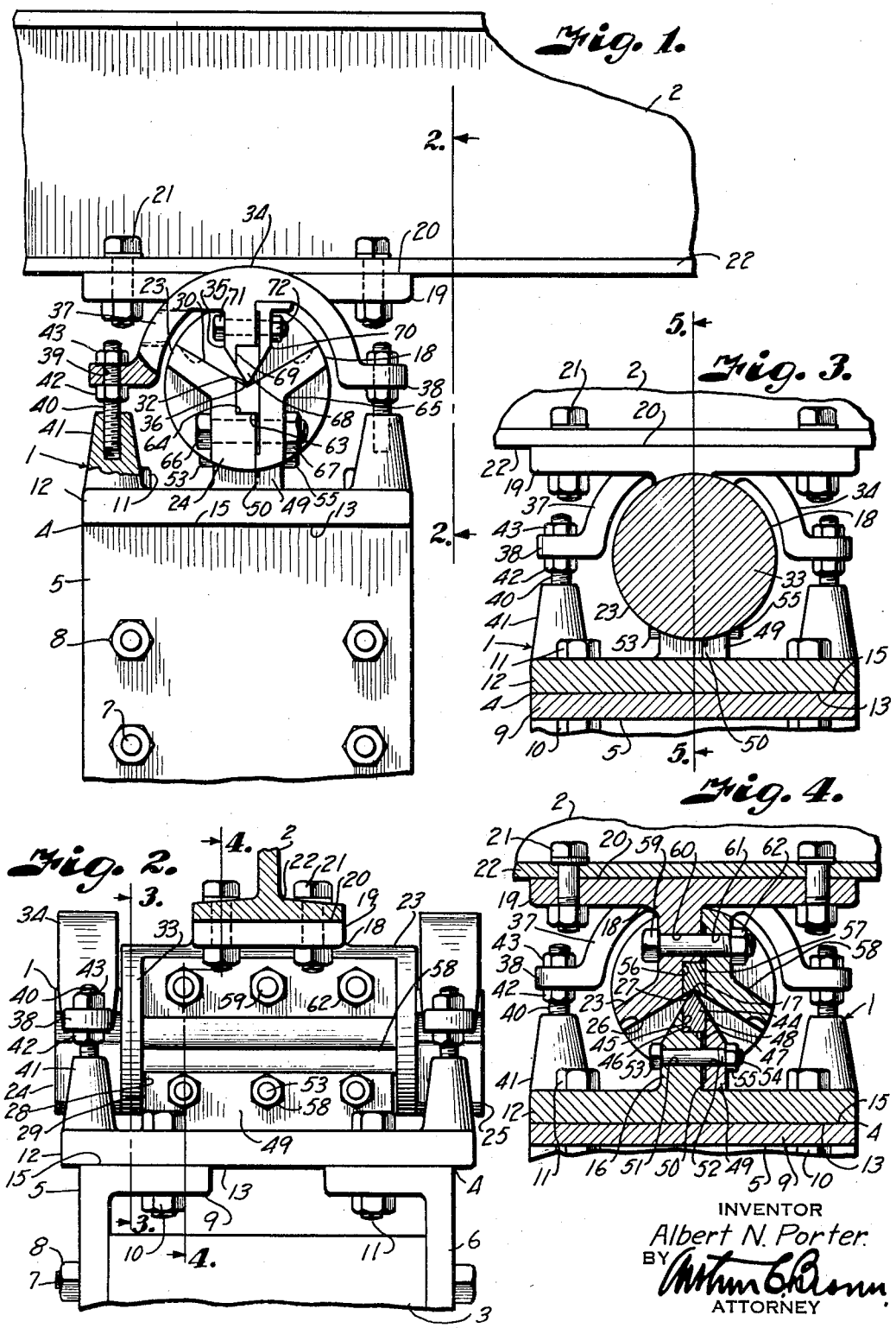
INVENTOR
Albert N. Porter
BY
ATTORNEY

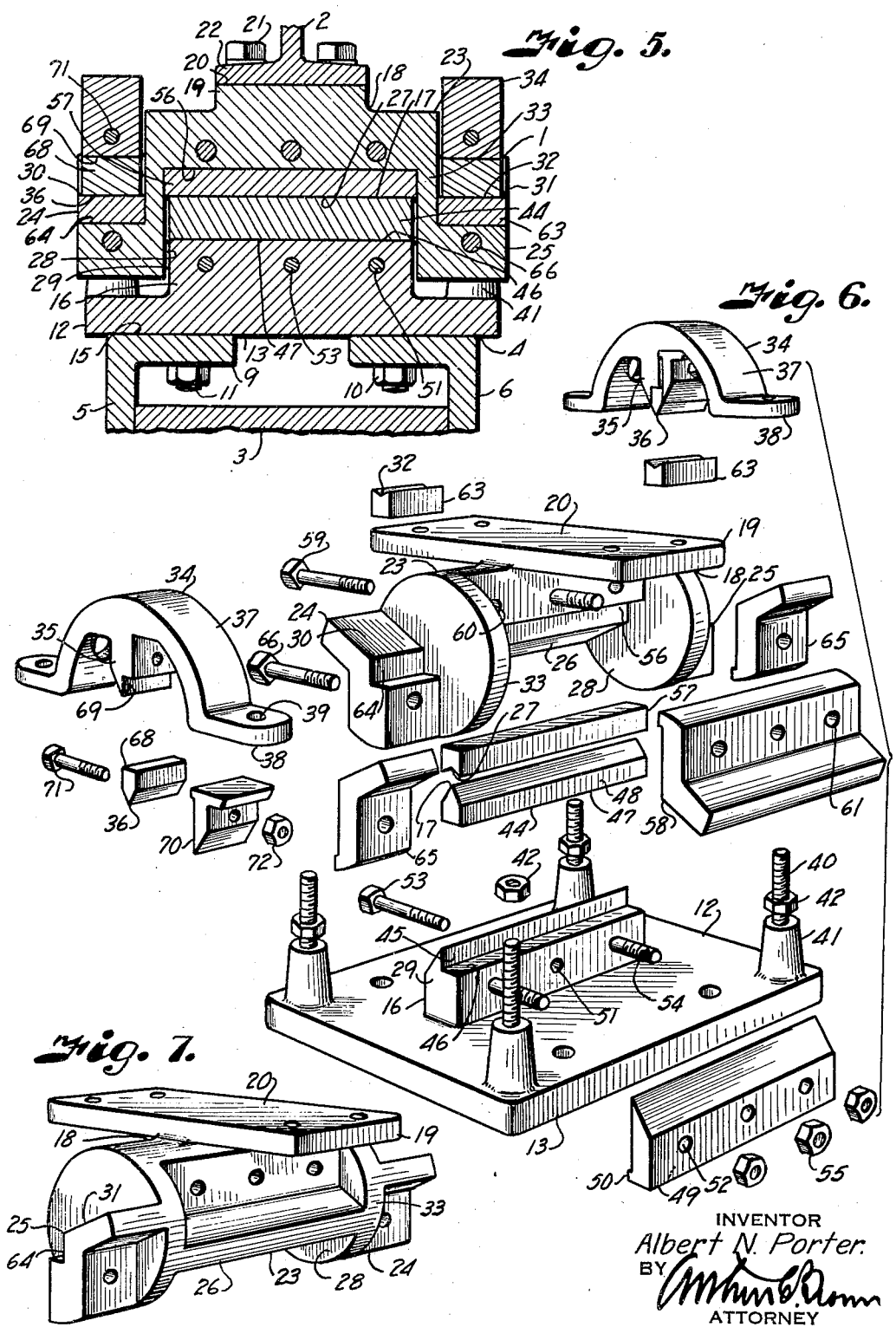

March 28, 1939. A. N. PORTER 2,152,387
OILLESS BEARING
Filed May 1, 1937 3 Sheets-Sheet 3
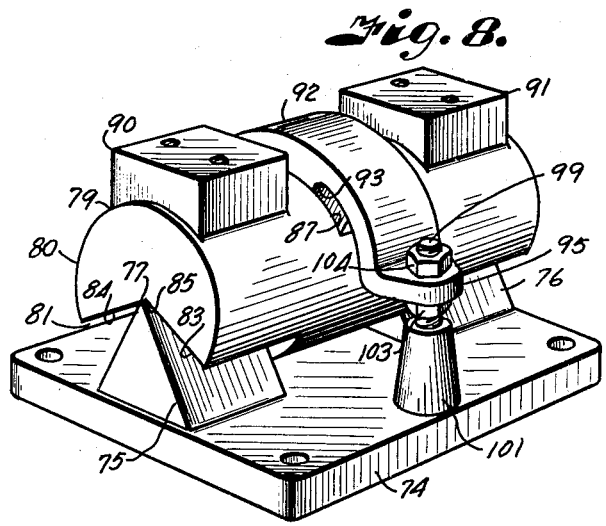
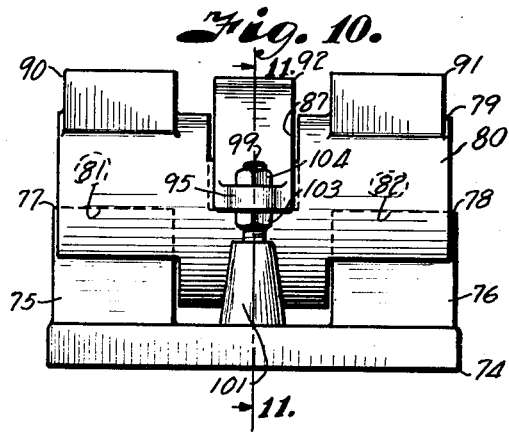
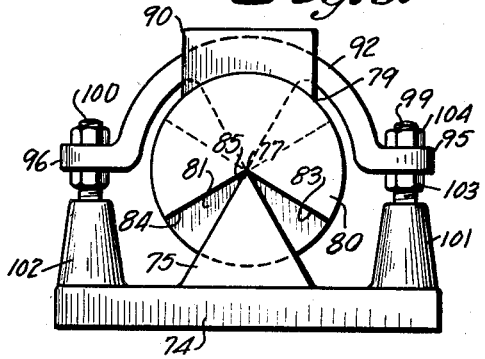
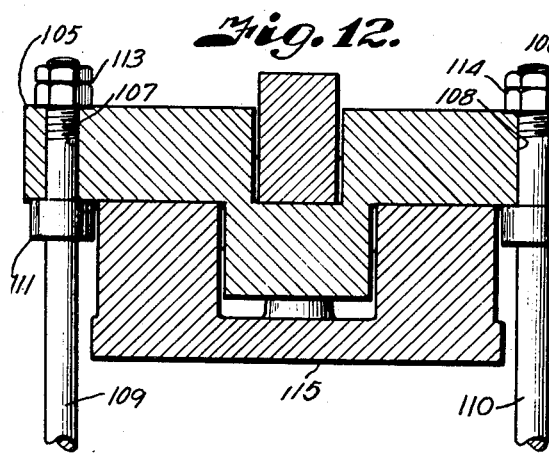
INVENTOR
Albert N. Porter.
BY
ATTORNEY Patented Mar. 28, 1939

2,152,387

UNITED STATES PATENT OFFICE 2,152,387

OILLESS BEARING

Albert N. Porter, Tulsa, Okla., assignor to J. F. Darby, Tulsa, Okla.

Application May 1, 1937, Serial No. 140,220

3 Claims. (Cl. 308—2)

This invention relates to bearings and more particularly to those adapted for mounting rocking members, such as a walking beam on the Samson-post of a well pumping rig.

Knife edge bearings have been used in the past to provide oilless mountings for rocking members, straps and clamps of various designs being used for retaining the rocking member in seated position relative to its bearing. It was found, however, that friction was necessarily caused by the sliding action between the retaining member and the rocking portion of the bearing.

The present invention has for its principal objects to provide an oilless bearing having substantially frictionless contact between the retaining members and the rocking member; to provide knife edge retaining members for holding the rocking member seated in the bearing; to provide a bearing having a plurality of knife edges aligned so as to cooperate in retaining a member seated for rocking movement in the respective bearing seats; to provide for adjusting the knife edges in correcting misalignment due to wear; to provide hardened wear resisting inserts for the bearing portions; and to provide for the ready replacement of the inserts when worn.

In accomplishing these and other objects of the invention, as hereinafter pointed out, I have provided improved details of structure, the preferred forms of which are illustrated in the accompanying drawings, wherein:

Fig. 1 is a side elevational view of the upper portion of a Samson-post and the adjacent part of a walking beam, illustrating application of a saddle embodying the features of the present invention.

Fig. 2 is a section through the walking beam on the line 2—2, Fig. 1.

Fig. 3 is a transverse section through the bearing on the line 3—3, Fig. 2.

Fig. 4 is a transverse section through the bearing on the line 4—4, Fig. 2.

Fig. 5 is a longitudinal section through the center of the bearing on the line 5—5, Fig. 3.

Fig. 6 is a detail perspective view of the respective parts of the bearing shown in disassembled spaced relation.

Fig. 7 is a perspective view of the rocking member.

Fig. 8 is a perspective view of a modified form of the invention.

Fig. 9 is an end elevational view of the form of the invention illustrated in Fig. 8.

Fig. 10 is a side elevational view of the form of the invention illustrated in Fig. 8.

Fig. 11 is a cross-section on the line 11—11 of Fig. 10.

Fig. 12 is a longitudinal section through a further modified form showing the invention as adapted for supporting the hanger rods of a pumping unit.

Referring more in detail to the drawings:

1 designates a saddle, constructed in accordance with the present invention, for mounting a walking beam or similar rocking member 2 upon a Samson-post or similar support 3. The saddle includes a fulcrum member 4 consisting of side irons 5 and 6 attached to the Samson-post by means of studs 7 extending through suitable openings in the side irons and through aligning openings in the post, the side irons being secured to the post by nuts 8 on the threaded ends of the studs, as shown in Figs. 1 and 2. The side irons project above the upper end of the post and terminate in arms 9 extending laterally over the top of the post, the arms being spaced therefrom for accommodating the heads 10 of fastening devices, such as bolts, 11 for attaching a cross plate 12 of the fulcrum member to the side arms. The cross plate 12 has a substantially flat bottom surface 13 seated upon the flat upper portions 15 of the side irons in such a manner that when the fastening devices 11 are inserted, the cross plate is drawn into rigid relation therewith.

Located on, and spaced from the ends of the plate 12, transversely of the center line of the post, is an inverted substantially V shaped rib 16 having an apical or knife-like edge 17 forming a fulcruming point for the rocking member 18. The rocking member includes a plate portion 19 having a flat upper face 20 for seating the walking beam 2, the beam being secured on the plate by bolts 21 having threaded shanks extending through aligned openings in the beam flange 22 and the plate. Nuts are threaded on the shanks to rigidly secure the beam on the plate.

The central portion of the rocking plate has an integral depending trunnion 23 having projecting ends 24 and 25 of such length that the ends of the trunnion member extend past the ends of the knife edged rib 16. The lower central portion of the trunnion member is provided with a longitudinal inverted V shaped groove 26 substantially the length of the rib 16, and having a greater angle than the angle formed by the sides of the rib in order to allow free rocking movement of the walking beam when the knife edge of the rib is engaged in the bottom or apex 27 of the V shaped groove, as shown in Fig. 4.

In order to prevent lateral movement of the rocking member relative to the fulcrum member, the ends 28 of the groove 26 overlappingly engage the end faces 29 of the rib 16, as best illustrated in Fig. 5. The upper portions of the projecting ends 24 and 25 of the trunnions are provided with V shaped grooves 30 and 31, similar to and having apices 32 coincident with the apex 27 of the groove 26. The upper grooves terminate short of the ends of the lower groove to provide a solid portion 33 connecting the outer and inner grooved portions of the rocking member, the length of the solid portion varying according to the loads for which the bearing is designed. Extending over the grooves are hold-down clamps or retaining members 34 having depending V shaped ribs 35, similar to the rib 16, and having apical or knife edges 36 engaging in the bottom or apex of the grooves 30 and 31 to provide a pair of oilless bearings opposite to the bearing 17 and on a common axis therewith so that the beam may rock about said axis without relative lateral or longitudinal movement thereto.

The retaining members consist of arcuate arms 37 extending downwardly and outwardly from the base of the rib 35 and terminating in ears 38 having openings 39 therein for sleeving over the threaded ends of studs 40 which project upwardly from bosses 41 located adjacent the edges of the fulcrum plate. The retaining members are supported in adjusted position by nuts 42 threaded on the studs and engaging the lower faces of the ears 38, nuts 43 being threaded on the upper ends of the studs to lock the retaining members in the adjusted position.

The device thus far described provides a bearing in which there is no friction and, therefore, does not require lubrication. However, I have found that in some installations, it is desirable to form the bearing points of hard, wear resisting material that is less formable under the crushing loads encountered in very deep wells. Even the hardest bearing points are subject to wear; therefore, I have provided the bearing rib 16 with a replaceable insert 44. The rib 16 is provided with an open-sided socket 45 having a base 46 of less width than the bottom face 47 of the insert. The side 48 of the insert projecting from the socket is engaged by the inner face of a clamp plate 49, an inwardly projecting rib 50 being provided on the lower end of the face for fulcruming the plate on the side of the rib 16. Extending through openings 51 and 52 in the rib and clamp plate respectively, are bolts 53 having shanks 54 on which nuts 55 are threaded to draw the clamp plate into locking engagement with the insert. The upper end of the insert is ground into an inverted V shape or a knife edge having side faces aligning with the side faces of the rib 16 and clamp plate.

The groove in the lower portion of the rocking member is provided with a similar socket 56 for receiving an insert 57, the projecting side of which is engaged by a clamp plate 58, fulcrumed on the side of the rocking member and having an angularly extending wing forming one side of the groove in the rocking member. Bolts 59 extend through openings 60 and 61 in the rocking member and plate respectively, and have nuts 62 threaded thereon for drawing the plate 58 into locking engagement with the insert. The lower face of the insert is ground into an inverted V shape having faces in alignment with the faces of the groove to form a seat for receiving the apex of the insert in the rib 16.

The grooves 30 and 31 in the outer ends of the rocking member are similarly provided with inserts 63 having V shaped grooves and held in sockets 64 by clamp plates 65 shaped like the plate 58 and secured to the rocking member by bolts 66 and nuts 67.

The ribs of the retaining members are also provided with inserts 68 having knife edges for seating in the grooved inserts 63, the inserts being secured in sockets 69 in the ribs by plates 70, bolts 71 and 72 being provided for holding the plates on the rib.

In assembling a bearing of this character, the fulcrum plate is placed on the side irons and secured thereto by the bolts 11. The insert 44 is seated in the socket in the rib 16 and secured in place by tightening the nuts on the bolts 53 to draw the clamp plate into engagement with the insert. The grooved insert 57 is placed in its socket 56 in the rocking member and secured in place by drawing the clamp plate 58 into engagement therewith with the bolts 59.

The inserts 63 are placed in the grooves 30 and 31, and the apices thereof aligned with the apex of the insert 57, by placing shims in the grooves under the inserts or by grinding out the V shaped grooves as required. It is essential that these points be in alignment in order that the bearings have a common axis. The rocking member is secured to the walking beam by the bolts and nuts 31 and the groove in the rocking member is seated on the bearing rib 16 of the fulcrum member. The walking beam is then free to rock on the rib 16.

In order to prevent vibration or jumping of the beam under varying loads, the studs 40 are threaded into the bosses on the fulcrum plate. The nuts 42 are threaded onto the studs and the retaining members, having the inserts 68 thereof clamped in place by the plates 70, are sleeved onto the studs and supported on the nuts which are adjusted until the apices of the retaining members are seated in the grooves of the inserts 63. The retaining members are then secured in place by the nuts 43.

When the walking beam is actuated, the trunnion of the rocker member rocks upon the knife edge of the fulcrum member. The apices of the ribs of the retaining members, being in alignment with the apex of the fulcrum member, cause the rocking member to also rock on the retaining member in such a manner that all tendency of the rocking member to raise or move from its pivoted seating engagement with the fulcrum member is eliminated.

As the bearing points wear, alignment may be maintained by adjusting the nuts 42 supporting the clamps on the studs. When the inserts wear to a point making it impossible to realign the apices of the bearings, realignment may be accomplished by removing the inserts and raising them by shims or replacing them by new inserts.

In the form of the invention illustrated in Figs. 8 to 11 inclusive, the cross plate 74 is provided with spaced projections 75 and 76 having substantially triangular cross-section to form aligning knife edge bearings 77 and 78 on which the rocking member 79 is fulcrumed. The rocking member 79 includes a substantially cylindrical body 80 having aligned V-shaped recesses 81 and 82 at the respective ends thereof and arranged with the side faces 83 and 84 extending radially from the axis of the body to form axial seats 85 engaging the knife edge bearings 77 and 78. The angles of the side faces are sufficient to allow the required movement of the rocking member relatively to the fulcrum member. Formed in the opposite side of the cylindrical body, substantially midway thereof, is a V-shaped recess 87, having its side faces 88 and 89 extending radially from the axis that extends through the axial seats 85. The cylindrical body of the rocking member may be provided with suitable lugs or the like 90 and 91 for attaching a beam or the like, similar to the plate 19 in the first form of the invention.

The rocking member is retained on the knife edge bearings of the fulcrum member by an arcuate strap 92 extending over the cylindrical body of the rocking member in alignment with the recess 87 and is provided with a retaining lug 93 of substantially V-shaped cross-section and having a knife-like bearing edge 94 engaging the bottom of the recess. The radial side faces of the recess substantially correspond to the angularity of the side faces 83 and 84 of the end recesses to allow for the required movement of the rocking member. The ends of the strap terminate in lateral ears 95 and 96 having openings 97 and 98 to pass anchoring studs 99 and 100 that are carried by lugs 101 and 102 projecting from the upper face of the plate 94. The strap is adjustably sustained on the studs to allow freedom of movement of the rocking member by means of spacing nuts 103 and 104 engaging the respective sides of the ears, as clearly shown in Fig. 11.

The form of the invention illustrated in Fig. 12 is substantially the same as that illustrated in Figs. 8 to 11, however, the ends 105 and 106 of the rocking member are shown as projecting beyond the sides of the cross-plate 115 and provided with openings 107 and 108 to pass hanger rods 109 and 110 which may be connected to the polish rod of a pump as in any conventional practice. The rods 109 and 110 carry stop collars 111 and 112 which cooperate with jam-nuts 113 and 114 to engage the respective upper and lower sides of the projecting ends 105 and 106 to secure the rods to the cross-plate.

From the foregoing, it is obvious that I have provided a walking beam or like mounting which, due to the plurality of aligned knife-edged bearings, does not require lubrication, causes no friction or drag, retains its centered position throughout the limits of its rocking motion, and consists of parts which may be readily replaced.

What I claim and desire to secure by Letters Patent is:

1. A bearing of the character described including a fulcrum member having a socket therein, a removable insert secured in said socket for forming the apex of said fulcrum member, means on the fulcrum member having bearing points directed oppositely to the fulcrum member and in alignment with the apex thereof, a rocking member having a trunnion provided with oppositely directed sockets, and removable inserts secured in said sockets for engagement with the insert on the fulcrum member and the bearing points to retain the rocking member centered on its axis.

2. A rocking member having a trunnion provided with a plurality of spaced sockets, removable inserts in the sockets having grooves therein, means adjustably connected with the trunnion for securing the inserts in position with the apices of the grooves of the respective inserts in alignment, a support, fulcrum members connected with the support having sockets therein aligning with the respective trunnion sockets, removable inserts secured in the sockets of the fulcrum members forming bearing points, and means on the support for adjusting the fulcrum members relative to each other for maintaining aligned engagement of the fulcrum bearing points with the respective grooves in the inserts of the trunnion sockets.

3. A rocking member having a trunnion provided with a plurality of open sided sockets spaced longitudinally and radially thereof, removable inserts in the sockets having grooves in the outer faces thereof, clamping plates adjustably connected with the trunnion for securing the inserts with the apices of the grooves of the respective inserts in longitudinal alignment, fulcrum members having sockets therein aligning with the respective trunnion sockets, removable inserts secured in the sockets of the fulcrum members forming apices thereof, and means for adjusting the fulcrum members relative to each other for maintaining alignment of the apices of the inserts in the fulcrum members with the respective grooves in the inserts in the trunnion.

ALBERT N. PORTER.